(12) United States Patent
Chen et al.

(10) Patent No.: US 7,626,150 B2
(45) Date of Patent: Dec. 1, 2009

(54) SYSTEM AND METHOD FOR CAPTURING IMAGE DATA OVER A WIDE FIELD OF VIEW WITH HIGH RESOLUTION

(75) Inventors: Chungte W. Chen, Irvine, CA (US); J. Steve Anderson, Santa Monica, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 11/713,932

(22) Filed: Mar. 5, 2007

(65) Prior Publication Data
US 2008/0218851 A1 Sep. 11, 2008

(51) Int. Cl.
*G02B 7/04* (2006.01)
*G02B 27/40* (2006.01)
*G02B 27/64* (2006.01)

(52) U.S. Cl. ............... 250/201.3; 250/216; 359/383; 356/310; 356/328

(58) Field of Classification Search ... 250/201.2–201.4, 250/216; 359/368, 382, 383; 356/325, 328, 356/330–334, 310
See application file for complete search history.

(56) References Cited

U.S. PATENT DOCUMENTS

| | | | | |
|---|---|---|---|---|
| 5,454,048 A | * | 9/1995 | Davis | 382/281 |
| 5,625,270 A | * | 4/1997 | Barker | 318/696 |
| 5,625,499 A | | 4/1997 | Chen | |
| 5,627,639 A | * | 5/1997 | Mende et al. | 356/310 |
| 6,630,952 B1 | | 10/2003 | Beale | |
| 2003/0142307 A1 | * | 7/2003 | Hutchin | 356/328 |
| 2005/0062966 A1 | * | 3/2005 | Chen et al. | 356/364 |

FOREIGN PATENT DOCUMENTS

EP 0 905 539 A 3/1999

OTHER PUBLICATIONS

M. Harwit & N. Sloane, Hadamard Transform Optics, Academic Press, 1979, pp. 191-194.
Bone, D. J. et al, Multiresolution scanning imager . . . , Sensors & Camera Sys Scientific Industri & Photo Appl, Jan. 24-26, 2000, pp. 437-450, vol. 3965, SPIE-Int Soc Opt Eng, USA.

* cited by examiner

*Primary Examiner*—Thanh X Luu
*Assistant Examiner*—Francis M Legasse, Jr.
(74) *Attorney, Agent, or Firm*—Leona A. Alkov

(57) ABSTRACT

A sensor assembly including a detector; a first arrangement for enhancing the resolution of the detector; and a second arrangement for increasing the field-of-view of the detector. In a specific implementation, the detector is a focal plane array of detectors, the first arrangement is a Hadamard mask and the second arrangement is a telescope array with a field-bias element operationally coupled thereto. The field bias optical element is implemented with a prism and grating such as a grism. An arrangement is included for actuating the mask to selectively enable a desired level of resolution and another arrangement is included for actuating the field bias element to select a desired field of view. An arrangement for effecting image motion compensation is included along with an imager, an image processor and a data processor. The telescope array may include refractive elements, reflective elements, and/or catadioptric elements. Likewise, the imager may be refractive, reflective and/or catadioptric.

29 Claims, 3 Drawing Sheets

Object [2 4 6 8]
[1 1 1 1] • [2 4 6 8]$^{-1}$ = 20  Mask 1 
[1 1 0 0] • [2 4 6 8]$^{-1}$ = 6  Mask 2 
[1 0 1 0] • [2 4 6 8]$^{-1}$ = 8  Mask 3 
[1 0 0 1] • [2 4 6 8]$^{-1}$ = 10  Mask 4 
*FIG. 2*
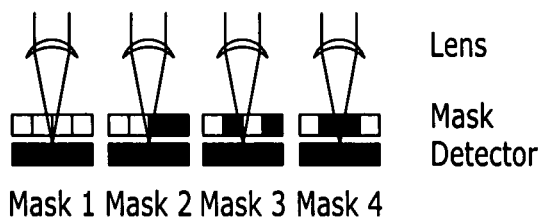
*FIG. 3*
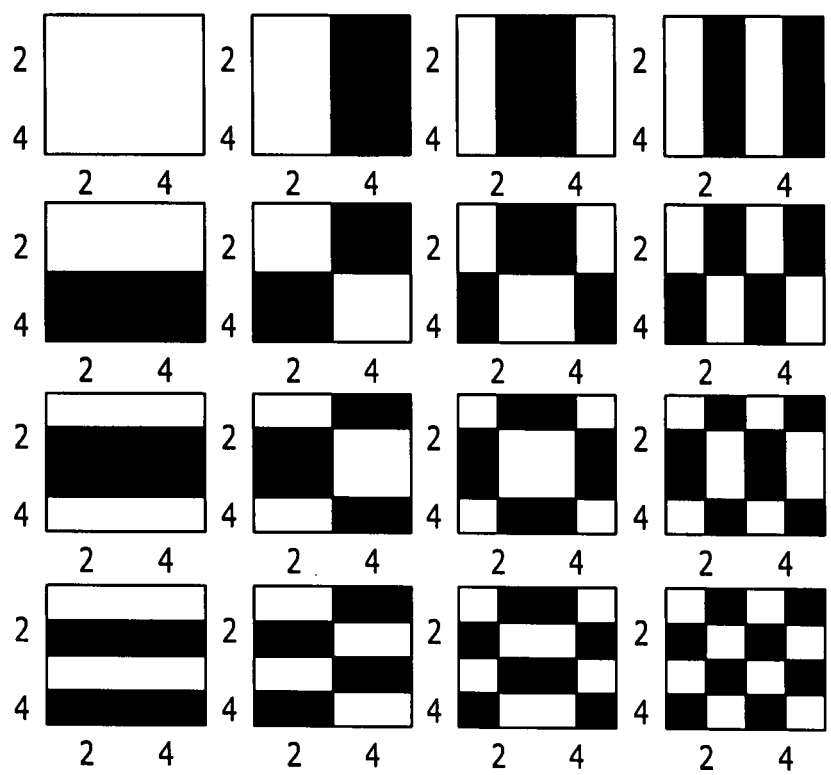

SYSTEM AND METHOD FOR CAPTURING IMAGE DATA OVER A WIDE FIELD OF VIEW WITH HIGH RESOLUTION

BACKGROUND OF THE INVENTION

1. Field of the Invention

The present invention relates to sensors and optical arrangements therefor. More specifically, the present invention relates to optical arrangements for sensors and arrays thereof.

2. Description of the Related Art

Conventional staring sensor systems operating in the visible or infrared spectrum force a compromise between field of view and image resolution or sensitivity.

Persistent surveillance and tracking requires a wide field of view, high-resolution sensor capable of mapping out a large area within a very short period of time. For military and other applications, a next generation sensor for persistent surveillance might require both high resolution and wide field of view (FOV) such that it can identify potential targets over a large area within a short time period.

Although a single high resolution sensor mounted on a gimbal can perform this function to some extent. However, for most applications, such a system would require a considerable and unacceptable amount of time to accommodate gimbal settling time between image captures.

Hence, a need remains in the art for a system or method for capturing image data over a wide field of view with high resolution.

SUMMARY OF THE INVENTION

The need in the art is addressed by the sensor assembly of the present invention. In the illustrative embodiment, the inventive sensor assembly includes a detector; a first arrangement for enhancing the resolution of the detector; and a second arrangement for increasing the field-of-view of the detector.

In a more specific implementation, the detector is a focal plane array of detectors, the first arrangement is a Hadamard mask and the second arrangement is a telescope array with a field-bias element operationally coupled thereto. The field bias optical element may be implemented with a prism and grating such as a grism. An arrangement is included for actuating the mask to selectively enable a desired level of resolution and another arrangement is included for actuating the field bias element to select a desired field of view.

In more specific embodiments, an arrangement for effecting image motion compensation is included along with an imager, an image processor and a data processor. The telescope array may include refractive elements, reflective elements, and/or catadioptric elements. Likewise, the imager may be refractive, reflective and/or catadioptric.

This invention, based on a Hadamard mask multiplexing technique, enables a telescope array to cover a wide field of view with a single focal plane array. In accordance with the present teachings, a single FPA can be shared by a telescope array. Therefore, cost is reduced significantly and the calibration process is simplified. This creates a potential for high resolution and wide field of view relative to a conventional wide field of view sensor.

BRIEF DESCRIPTION OF THE DRAWINGS

FIG. 2 is a series of diagrams showing the use of four different masks between a lens and a single detector in accordance with a one-dimensional Hadamard multiplexing scheme.

FIG. 3 shows illustrative 4×4 Hadamard masks.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

As disclosed more fully below, the need in the art is addressed with an inventive sensor assembly including a telescope array, a field bias element, a Hadamard mask and a focal plane array of detectors. Thus, the invention provides a first arrangement for enhancing the resolution of a detector and a second arrangement for increasing the field-of-view thereof. An arrangement is included for actuating the mask to selectively enable a desired level of resolution and another arrangement is included for actuating the field bias element to select a desired field of view. This is depicted in FIG. 1.

Figure 1:
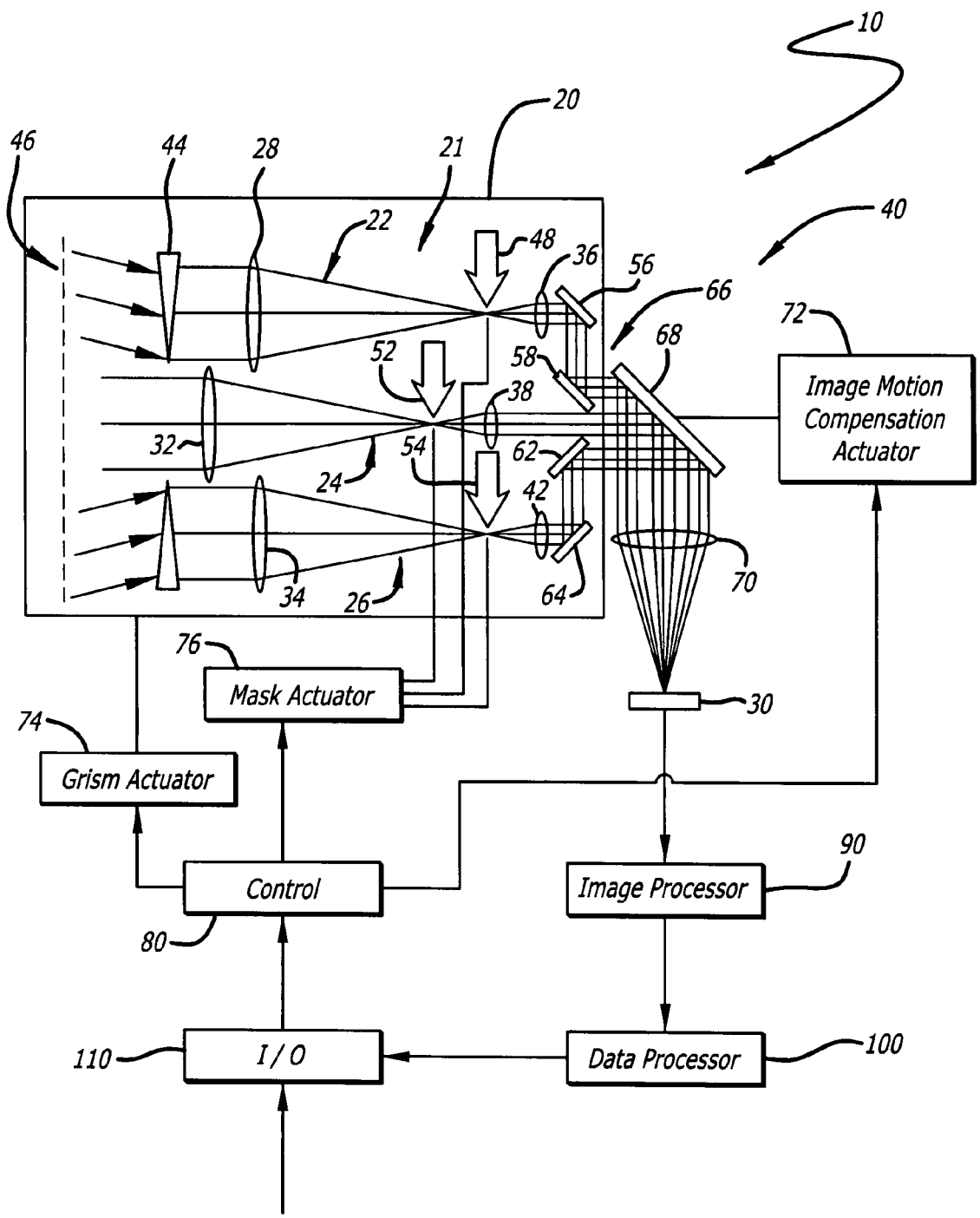
FIG. 1 is an optical schematic of a wide field of view coded aperture sensor assembly implemented in accordance with the present teachings.
Figure 1A:
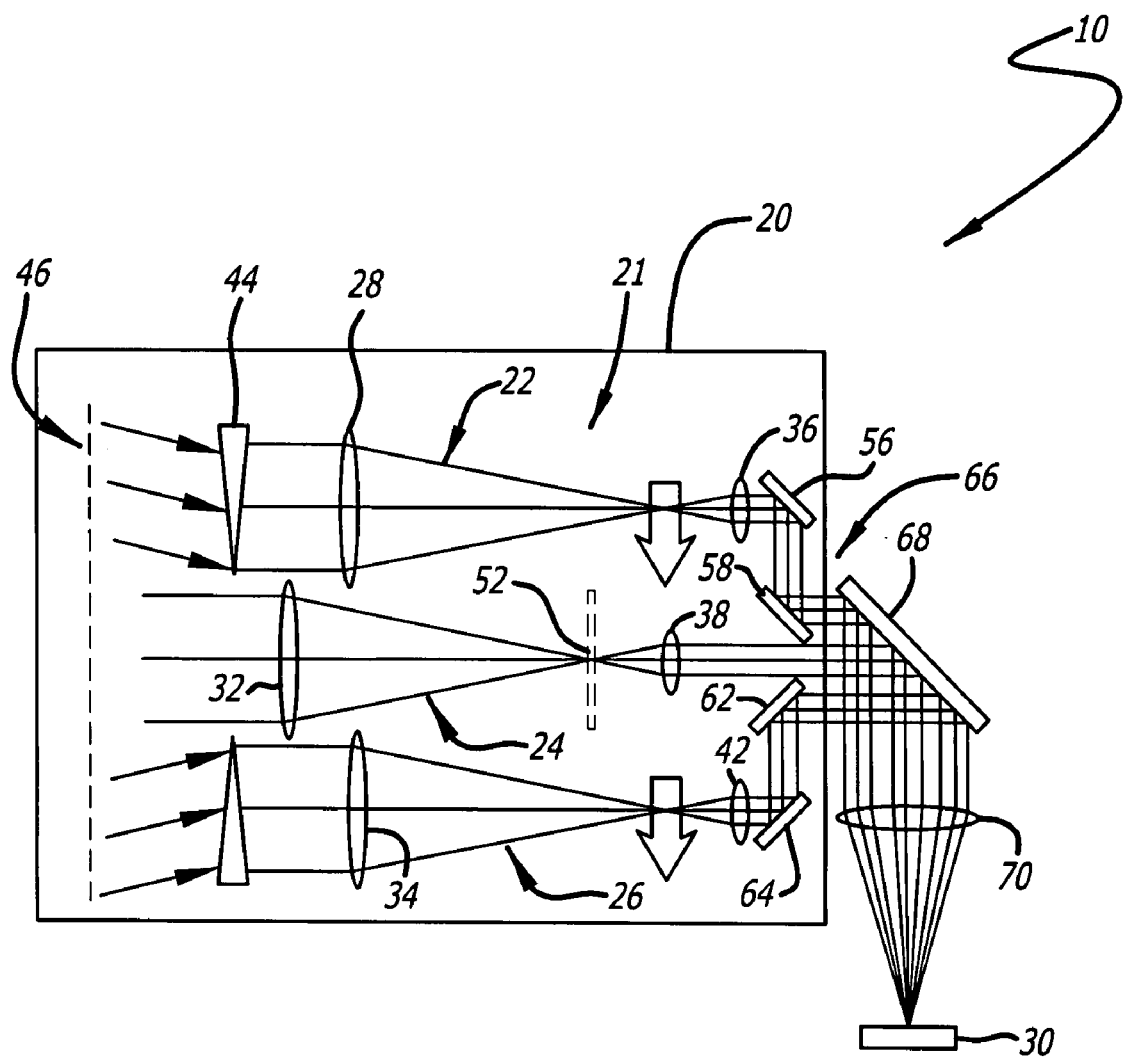
FIG. 1a is a diagram with depicts an insertion of a Hadamard mask in the image plane of the central telescope in FIG. I with a block out the rest of telescope, the sensor to achieve super-resolution in accordance with the present teachings.

FIG. 1 is an optical schematic of a wide field of view coded aperture sensor assembly implemented in accordance with the present teachings. As shown in FIG. 1, the assembly 10 includes a telescope array assembly 20 coupled to a focal plane array of detectors 30 via an image motion compensator (IMC) 40. The telescope array assembly 20 includes an array 21 of telescopes 22, 24 and 26. In the illustrative embodiment, the array 21 includes three telescopes. However, those skilled in the art will appreciate that the invention is not limited thereto. Any number of telescopes may be used without departing from the scope of the present teachings.

Each telescope 22, 24 and 26 includes a first objective lens group 28, 32, and 34, respectively and a second eyepiece lens group 36, 38 and 42, respectively. The lenses may be of conventional design and construction.

The present invention operates in a true Fourier transform pupil space in which a single FPA is enabled by dividing the FOV thereof with GRISM controlled elements. Thus, in accordance with the present teachings, a field-bias optical element 44 is disposed between the telescope array 21 and the telescope entrance pupil 46 to address the desired field of view (FOV) or designated field of regard (FRD). In the best mode, the field bias optical element is implemented with a prism and grating such as a 'grism' disclosed and claimed in U.S. Pat. No. 5,625,499, issued Apr. 29, 1997 to C. W. Chen and entitled Achromatic and Apochromatic Prism Element Employing Prisms and Gratings the teachings of which are hereby incorporated herein by reference. As an alternative, the field bias optical element may be a head mirror.

In accordance with the present teachings, each telescope 22, 24 and 26 has a mask 48, 52 and 54, respectively, located at the intermediate image plane between the first and second lenses thereof. The three telescopes 22, 24 and 26 are co-aligned by first, second, third and fourth fold mirrors 56, 58, 62 and 64 and directed through the telescope array exit pupil 66 to the IMC 40. The IMC 40 includes a compensation mirror 68 and an actuator 72 operative under the direction of the controller 80. The compensation mirror 68 and the actuator 72 may be of conventional design and construction.

The compensation mirror 68 combines the images output by the telescope array and directs the combined image to an imager 70 with image motion compensation provided by the actuator 72 and controller 80. The output of the imager 70 is input to the focal plane array 30. The actuator IMC 72 and the FPA 30 may be of conventional design and construction.

The controller 80 also provides actuation controls for a field bias element actuator 74 and a mask actuator 76. The controller may be implemented in software with a general purpose processor or with discrete circuits such as a field-programmable gate array (FPGA) or an application specific integrated circuit (ASIC).

The output of the focal plane array 30 is input to an image processor 90. The image processor 90 in turn feeds a data processor 100. User input and output is provided by an interface 110. The image and data processors 90 and 100 and the user interface may also be of conventional design and construction.

In operation, a desired field of view is selected by a user via input/output interface 110, controller 80, actuator 74 and field bias element 44. Energy (optical or infrared) from the selected telescope(s) in the array illuminates an associated mask. The masks are turned on or off according to Hadamard binary matrix format. Hence, each pixel of the FPA will receive the radiation from telescopes when the masks associated with the telescopes are on. For an n×n telescope array, there will be $n^2$ measurements associated with the $n^2$ mask patterns. The image from each telescope is retrieved through an inverse matrix operation as described more fully below.

FIG. 1$a$ is a diagram with depicts an insertion of a Hadamard mask in the image plane of the central telescope in FIG. 1 with a block out the rest of telescope, the sensor to achieve super-resolution in accordance with the present teachings. FIG. 1$a$ is a derivative of FIG. 1 but optimized to achieve higher resolution instead of wide field-of-view. By blocking every telescope except the central telescope 24 and replacing the blocking filter of the central telescope with a Hadamard mask, as shown in FIG. 3, the telescope is now capable of super-resolution. In this way, the difficulty associated with the deployment of the Hadamard in the focal plane has been obviated. The intermediate image where the Hadamard mask deployed is conjugated relative to that of the focal plane array (FPA) 30.

Hence, it is evident that the combined features of configurations of FIGS. 1 and 1$a$ provide a sensor that is capable of both super resolution and a wide field of view. The present teachings obviate the complication associated with a typical sensor to insert and remove optical elements to achieve these functions.

FIG. 2 is a series of diagrams showing the use of four different masks between a lens and a single detector in accordance with a one-dimensional Hadamard multiplexing scheme. FIG. 2 serves to illustrate how to use Hadamard masks to obtain sub-pixel resolution. FIG. 2 is an example of a single detector pixel capable of sub-pixel resolution through 4 exemplary measurements. For each measurement, a mask is placed right in front of the detector. The four illustrative binary masks are [1 1 1 1], [1 1 0 0], [1 0 1 0] and [1 0 0 1]. If the high-resolution object irradiance distribution is [2 4 6 8], the four measurements associated with the 4 masks will be [20 6 8 10].

As shown below, the set of masks can be represented as a matrix, a "Hadamard matrix" (M), which, when multiplied by the high-resolution object image matrix O, yields the input matrix I.

$$M \cdot O = \begin{bmatrix} 1 & 1 & 1 & 1 \\ 1 & 1 & 0 & 0 \\ 1 & 0 & 1 & 0 \\ 1 & 0 & 0 & 1 \end{bmatrix} \cdot \begin{bmatrix} 2 \\ 4 \\ 6 \\ 8 \end{bmatrix} = \begin{bmatrix} 20 \\ 6 \\ 8 \\ 10 \end{bmatrix} = I$$

The original high resolution object image matrix O can be retrieved by taking the inverse of the Hadamard matrix M and multiplying this inverse matrix $M^{-1}$ by input measurements I.

$$M^{-1} \cdot I = \begin{bmatrix} -1/2 & 1/2 & 1/2 & 1/2 \\ 1/2 & 1/2 & -1/2 & -1/2 \\ 1/2 & -1/2 & 1/2 & -1/2 \\ 1/2 & -1/2 & -1/2 & 1/2 \end{bmatrix} \cdot \begin{bmatrix} 20 \\ 6 \\ 8 \\ 10 \end{bmatrix} = \begin{bmatrix} 2 \\ 4 \\ 6 \\ 8 \end{bmatrix} = O$$

The inverse Hadamard matrix is obtained by a standard linear algebraic operation. See chapter 7.6 of *Hadamard Transform Optics* by M. Harwit and N. Sloane, published 1979 by Academic Press (pp. 191-194). A 2-dimensional Hadamard 4×4 mask is shown in FIG. 3.

FIG. 3 shows illustrative 4×4 Hadamard masks. The corresponding matrix is shown in FIG. 7.8 (page 193) of the above-referenced section from the book *Hadamard Transform Optics*. The matrix can be a generalized n×n matrix with $n^2$ masks. In any event, as shown in FIGS. 2 and 3, sub-Nyquist resolution can be obtained through the Hadamard mask multiplexing technique in accordance with the present teachings.

As mentioned above, the masked images from the telescope array 21 are co-aligned by first, second, third and fourth fold mirrors 56, 58, 62 and 64 and directed through the telescope array exit pupil 66 to the image motion compensation mirror 68. The compensation mirror 68 combines the images output by the telescope array and directs the combined image to the imager 70. The output of the imager 70 is input to the focal plane array 30. The output of the focal plane array 30 is input to the image processor 90. The image processor 90 in turn feeds a data processor 100.

Hence, the multiplexing technique described herein employs masks in the image plane to achieve resolution beyond Nyquist limit. As an alternative, the masks can be applied in the pupil plane to achieve n×n times wider field of view (FOV) with the same resolution in a single telescope.

Those skilled in the art will appreciate that the present invention offers 1) either n times field of view coverage or n times resolution improvement and 2) multiplexing accomplished in the pupil space instead of image space. Hence the present invention it may be easier to implement than the conventional alternative.

In addition, the invention, based on Hadamard Mask multiplexing technique, enables the use of a telescope array to cover a wide field of view with a single focal plane array (FPA). In addition, the novel use of a Hadamard multiplexing technique in this application allows for a single FPA to be shared by a telescope array. Hence, the present teachings allow for potential cost reductions and simplified calibration processes. In any event, the present teachings provide high resolution imaging sensor with a wide field of view.

Thus, the present invention has been described herein with reference to a particular embodiment for a particular application. Those having ordinary skill in the art and access to the present teachings will recognize additional modifications applications and embodiments within the scope thereof. For example, the telescope array may include refractive elements, reflective elements, and/or catadioptric elements. Likewise, the imager may be refractive, reflective and/or catadioptric.

It is therefore intended by the appended claims to cover any and all such applications, modifications and embodiments within the scope of the present invention.

Accordingly,

What is claimed is:

1. A sensor assembly comprising:
    focal plane array of detectors;
    first means including a Hadamard mask for enhancing the resolution of said detectors and means for actuating said mask;
    second means for increasing the field-of-view of said detectors, said second means including a grating prism and means for actuating said grating prism;
    control means for controlling said means for actuating said mask and said means for actuating said grating prism in response to input from a user to achieve resolution beyond Nyquist limit or a wider field of view at a predetermined resolution within a single telescope.

2. The invention of claim 1 wherein said mask is an absorber adapted to selectively block the incoming light.

3. The invention of claim 1 wherein said grating prism is a grism.

4. The invention of claim 1 further including means for effecting image motion compensation.

5. The invention of claim 1 further including an image processor coupled to said focal plane array of detectors.

6. The invention of claim 1 wherein said second means includes a telescope array.

7. The invention of claim 1 wherein said control means includes means for multiplying an inverse Hadamard matrix by input measurements.

8. The invention of claim 1 wherein said control means includes means for using said mask in the pupil plane to provide n×n times wider field of view with a predetermined resolution in a single telescope.

9. The invention of claim 4 wherein said means for effecting image motion compensation is coupled to said control means.

10. The invention of claim 5 further including a data processor coupled to said image processor.

11. The invention of claim 5 wherein said control means is coupled to said image processor.

12. The invention of claim 6 wherein said telescope array includes a refractive telescope.

13. The invention of claim 6 wherein said telescope array includes a reflective telescope.

14. The invention of claim 6 wherein said telescope array includes a catadioptric telescope.

15. The invention of claim 6 wherein said array has a field-bias optical element.

16. The invention of claim 6 wherein said first means is a mask located in the optical train of the telescope.

17. The invention of claim 6 further including means for effecting image motion compensation.

18. The invention of claim 6 further including an imager at the output of said telescope array.

19. The invention of claim 15 wherein said field-bias optical element is a mirror.

20. The invention of claim 16 wherein said mask is a Hadamard mask.

21. The invention of claim 18 wherein said imager is a refractive imager.

22. The invention of claim 21 wherein said imager is a reflective imager.

23. The invention of claim 22 wherein said imager is a catadioptric imager.

24. The invention of claim 7 wherein said control means includes means for using said inverse Hadamard matrix to provide sub-pixel resolution.

25. A method for sensing an image including the steps of:
    using a Hadamard mask and means for actuating said mask to enhance the resolution of a focal plane array of detectors;
    increasing the field-of-view of said detectors with a grating prism and means for actuating said grating prism; and
    controlling said means for actuating said mask and said means for actuating said grating prism in response to input from a user to provide an image optimized for resolution or field of view.

26. The invention of claim 25 wherein the step of controlling further includes the step of receiving input from an image processor and providing control signals to a motion compensator.

27. The invention of claim 25 wherein said control means includes means for multiplying an inverse Hadamard matrix by input measurements.

28. The invention of claim 25 wherein said control means includes means for using said mask in the pupil plane to provide n×n times wider field of view with a predetermined resolution in a single telescope.

29. The invention of claim 27 wherein said control means includes means for using said inverse Hadamard matrix to provide sub-pixel resolution.

* * * * *